US012648560B2

(12) United States Patent (10) Patent No.: US 12,648,560 B2
Grison et al. (45) Date of Patent: Jun. 9, 2026

(54) MOSQUITO REPELLENT COMPOSITION AND METHOD FOR THE PREPARATION THEREOF

(71) Applicants: Centre National de la Recherche Scientifique, Paris (FR); Université de Montpellier, Montpellier (FR)

(72) Inventors: Claude Grison, Castelnau le Lez (FR); Andrii Stanovych, Jacou (FR)

(73) Assignees: Centre National de la Recherche Scientifique, Paris (FR); Université de Montpellier, Montpellier (FR)

( * ) Notice: Subject to any disclaimer, the term of this patent is extended or adjusted under 35 U.S.C. 154(b) by 997 days.

(21) Appl. No.: 17/625,744

(22) PCT Filed: Jul. 10, 2020

(86) PCT No.: PCT/EP2020/069523
§ 371 (c)(1),
(2) Date: Jan. 8, 2022

(87) PCT Pub. No.: WO2021/005204
PCT Pub. Date: Jan. 14, 2021

(65) Prior Publication Data
US 2022/0312763 A1 Oct. 6, 2022

(30) Foreign Application Priority Data
Jul. 10, 2019 (FR) ...................................... 1907765

(51) Int. Cl.
| | |
|---|---|
| *A61K 36/00* | (2006.01) |
| *A01N 31/02* | (2006.01) |
| *A01N 31/06* | (2006.01) |
| *A01N 65/08* | (2009.01) |
| *A01P 17/00* | (2006.01) |

(52) U.S. Cl.
CPC ............. *A01N 31/06* (2013.01); *A01N 31/02* (2013.01); *A01N 65/08* (2013.01); *A01P 17/00* (2021.08)

(58) Field of Classification Search
CPC . A01N 31/02; A01N 31/06; A01P 7/00; A01P 17/00
See application file for complete search history.

(56) References Cited

U.S. PATENT DOCUMENTS

| | | | |
|---|---|---|---|
| 7,344,728 B1 | 3/2008 | Perry | |
| 8,889,731 B2 * | 11/2014 | Gries .................... | C07C 323/12 |
| | | | 514/432 |
| 9,326,524 B1 | 5/2016 | Jack et al. | |
| 2003/0148370 A1 | 8/2003 | Ashkenazi et al. | |

FOREIGN PATENT DOCUMENTS

| | | | | |
|---|---|---|---|---|
| CA | 2637200 | C | * | 8/2016 |
| EP | 1412314 | B1 | * | 11/2009 |
| ES | 2475969 | T3 | * | 7/2014 |
| JP | 4337395 | A | | 11/1992 |
| WO | WO9707677 | A1 | * | 3/1997 |
| WO | 2009034352 | A1 | | 3/2009 |

OTHER PUBLICATIONS

Machine translation of CA2637200C, 46 pages. (Year: 2016).*
Machine translation of ES2475969T3, 6 pages. (Year: 2014).*
Machine translation of EP1412314B1, 8 pages. (Year: 2009).*
PCT Application No. PCT/EP2020/069523, International Search Report, Aug. 14, 2020, 3 pages.
French Patent Application No. 19 07765, INPI Rapport de Recherche Preliminaire, Nov. 26, 2019, 2 pages.
Germana et al., Characterization of Leaf Essential Oil Composition of Homozygous and Heterozygous Citrus cementina Hort. Extan. and its Ancestors, Journal of Essential Oil Bearing Plants, Feb. 1, 2013, pp. 92-101, vol. 16, No. 1.
Harimnder et al., Assessment of in Vitro Antioxidant Activity of Essential Oil Lemon-Scented Eucalyptus citriodora (lemon-scented Eucolypt; Myrtaceae) and its Major Constituents, LWT - Food Science and Technology, Mar. 21, 2012, pp. 237-241, vol. 48, No. 2, Academic Press, United Kingdom.

* cited by examiner

*Primary Examiner* — Qiuwen Mi

(74) *Attorney, Agent, or Firm* — ArentFox Schiff LLP

(57) ABSTRACT

A natural composition that includes p-menthane-3,8-diol, citronellol, and geraniol.

14 Claims, No Drawings

MOSQUITO REPELLENT COMPOSITION AND METHOD FOR THE PREPARATION THEREOF

CROSS-REFERENCE TO RELATED APPLICATIONS

This application claims benefit under 35 USC § 371 of PCT Application No. PCT/EP2020/069523 entitled MOSQUITO REPELLENT COMPOSITION AND METHOD FOR THE PREPARATION THEREOF, filed on Jul. 10, 2020 by inventors Claude Grison and Adnrii Stanovych. PCT Application No. PCT/EP2020/069523 claims priority of French Patent Application No. 19 07765, filed on Jul. 10, 2019.

FIELD OF THE INVENTION

The present invention relates to a natural composition that comprises p-menthane-3,8-diol, citronellol, and geraniol.

The present invention also relates to a method of synthesis of this composition, as well as the use of this composition as an insect repellent agent, in particular for repelling mosquitoes.

BACKGROUND OF THE INVENTION

The globalisation of trade and international passenger travel, is a major cause behind the widespread introduction of invasive insects. Thus, over the last decades, the geographical distribution of hematophagous (or blood-feeding) insects, and in particular of mosquitoes carrying vector-borne diseases, has increased considerably. Such insects represent a major health problem insofar as they transmit pathogenic agents believed to cause alarming epidemics.

Among these invasive insects, the tiger mosquito, or *Aedes albopictus*, accidentally imported from Southeast Asia, has found favourable breeding grounds in Europe, China and the Indian Ocean. The adaptability of this mosquito species is particularly worrying, because it is a potential vector of 20 disabling, and indeed even fatal diseases such as chikungunya, dengue and zika.

In the absence of vaccines for the majority of mosquito-borne diseases, the use of repellent agents is the primary measure for avoiding human-mosquito contact.

There currently exist two types of repellents: synthetic agents and natural products.

Synthetic repellents are the most widely used anti-mosquito insect repellents. The synthetic agent that is most highly active against the tiger mosquito is DEET or N,N diethyl-meta-toluamide. However, while its efficacy has been acknowledged, so too has its toxicity for the nervous system. It inhibits acetylcholinesterase, an enzyme that is essential to the cholinergic synaptic transmission of insects as also of mammals (Corbel et al., BMC Biol. 2009, 5; 7:47). This effect is to be compared to that of organophosphate pesticides or carbamates; and repeated use of DEET in combination with other substances is not recommended for children under 12 years of age and pregnant women.

These concerns about consumer safety and mosquito resistance to these synthetic repellents have led to a growing demand for natural alternatives.

Among the many existing natural products, only p-menthane-3,8-diol (PMD) has a significant repellent activity of interest. A 20% formulation of PMD has been shown to provide 7 to 8 hours of protection against *Aedes albopictus*, similar to a product containing 15% DEET (Barnard D R, Xue R-D, J Med Entomol 2004, 41(4):726-730), while also having low toxicity and no adverse effects, except for eye irritation, which is observed for all natural non-toxic active ingredients.

This organic compound may be extracted from the essential oil of lemon scented eucalyptus (*Corymbia citriodora*, equivalent to *Eucalyptus citriodora*), which is a species endemic to Australia. However, a limited amount (of the order 1%) of PMD is present in this essential oil. Given the restricted geographical distribution of *Eucalyptus citriodora*, the development of natural production of PMD is unable to satisfy the market demand. This is why the majority of PMDs used in repellents are derived from synthetic processes.

PMD can be synthesised from an abundantly occurring natural raw material: citronellal. This synthesis comprises of two steps: 1) the intramolecular ene-carbonyl reaction of citronellal to give isopulegol, followed by 2) the addition of $H_2O$ to the intermediate isopulegol.

A number of studies relating to this synthesis have been carried out.

For example, the patent U.S. Pat. No. 5,959,161 describes the aqueous phase synthesis of PMD in the presence of sulfuric acid $H_2SO_4$ from citronellal. A number of variants have also been proposed in order to promote the production of the cis stereoisomer of PMD, reputed to have better repellent activity than the trans stereoisomer (WO 9202136).

On the other hand, the synthesis of PMD catalysed by a Lewis acid has been less studied, because it is significantly less efficacious. For example, the use of $Mo(CO)_5OTf)_2$ in dimethoxyethane (DME) has been described (Kocovsky et al., J. Org. Chem. 1999, 64, 2765-2775). After a period of 48 hours, 80% cis stereoisomers of PMD had been obtained; however the preparation of the catalytic complexes used in these syntheses is a delicate process that is also dangerous and expensive.

Thus, in general, the methods of production for producing synthetic PMD involve the use of corrosive reagents, such as $H_2SO_4$, and/or the use of toxic solvents such as dichloromethane, toluene, benzene or DME, as well as neutralisation and/or purification steps that generate waste.

Thus for this reason, the use of natural catalysts has also been tested in order to develop more ecologically friendly processes and methods.

EP2862442 describes, for example, the use of citric acid as a catalyst for the reaction to convert citronellal into PMD. However, the solubility of the carboxylic acids in the organic phase necessitated a final treatment of the reaction mixture, which generated waste (solvent and inorganic salts). This neutralisation step resulted in a Sheldon's environmental factor (ratio of the mass of waste to the obtained mass of desired product) that was unsatisfactory from an ecological standpoint.

Thus, although some syntheses that make it possible to obtain PMD are bio-inspired, the qualification of "natural" attributed to the PMD obtained according to these methods is very often questionable, because if they were to be carefully examined, it could well be noted that these methods are far from being respectful of the environment.

Thus, there is a need to provide a repellent composition that repels hematophagous (or blood-feeding) arthropods, and in particular mosquitoes, which addresses one or more of the above technical problems; and in particular to provide a natural repellent composition that repels hematophagous arthropods, which is efficacious and non-toxic as compared to existing repellant agents.

There is also a need to provide a method for preparing a repellent composition that repels hematophagous arthropods, and in particular mosquitoes, which effectively serves to overcome the aforementioned drawbacks.

SUMMARY OF THE INVENTION

Thus, an objective of the present invention is to provide a composition that comprises p-menthane-3,8-diol, citronellol, and geraniol, and to provide a composition that can be used as a repellant agent against mosquitoes, the said repellent agent being more efficacious than those of the state of the art.

Another objective of the present invention is to provide a method for preparing a composition that comprises p-menthane-3,8-diol, citronellol, and geraniol in an efficient manner and which serves to ameliorate the impact thereof from an ecological standpoint.

The invention also serves the objective of resolving these technical problems by providing a method and a composition said to be natural, and in particular which can rightfully be labelled as 'natural' pursuant to the provisions of the relevant regulations, and preferably of the most stringent regulations. The invention also serves the objective of resolving these technical problems by providing a method that involves the use of solely natural reagents and a composition prepared solely from natural reagents.

DETAILED DESCRIPTION OF THE INVENTION

The present invention relates to a natural composition that comprises penthane-3,8-diol, citronellol, and geraniol.

Within the meaning and scope of the present patent application, the term "natural composition" is understood to refer to a composition that comprises or consists of one or more compounds, the said compound(s) being natural. The term "natural compound" is understood to refer to a compound that is present in nature or that can be extracted from an element present in nature and which has not undergone any additional chemical transformation not involving elements present in nature or extracted from nature, and/or a synthetic compound that can rightfully be qualified as natural according to the regulations of the European Flavour Association—EFFA. Preferably, the term "natural compound" is understood to refer to a compound that is present in nature or that can be extracted from an element present in nature and which has possibly undergone at least one additional chemical transformation, the said additional transformation only involving one or more elements that is/are present in nature or extracted from nature, and/or a synthetic compound that can rightfully be qualified as natural according to the regulations of the European Flavour Association—EFFA.

Within the meaning and scope of the present invention, p-menthane-3,8-diol (PMD) corresponds to (2-hydroxypropan-2-yl)-5-methylcyclohexan-1-ol, in the form of at least one of its stereoisomers or any one of the mixtures thereof.

PMD exists in the form of eight stereoisomers I-a, I-b, I-c, I-d, I-e, I-f, I-g, I-h having the following formula:

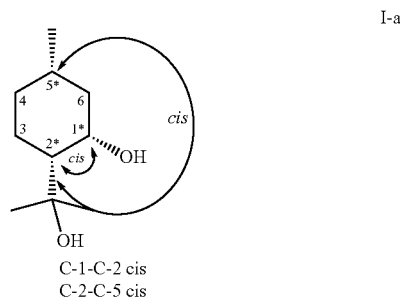

I-a

C-1-C-2 cis
C-2-C-5 cis

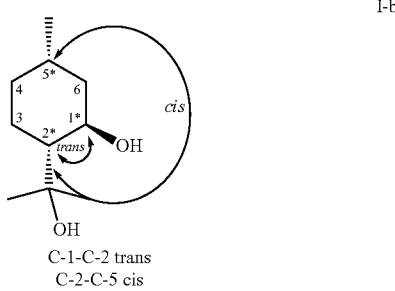

I-b

C-1-C-2 trans
C-2-C-5 cis

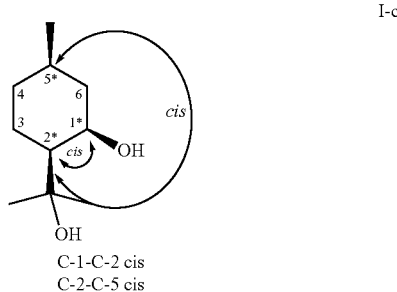

I-c

C-1-C-2 cis
C-2-C-5 cis

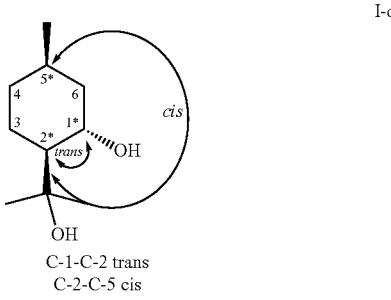

I-d

C-1-C-2 trans
C-2-C-5 cis

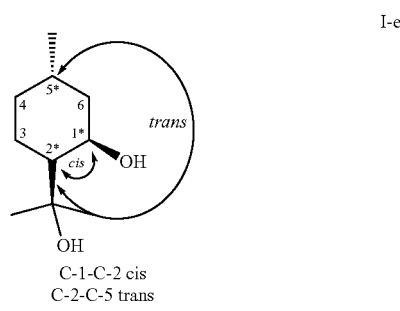

I-e

C-1-C-2 cis
C-2-C-5 trans

5

-continued

I-f

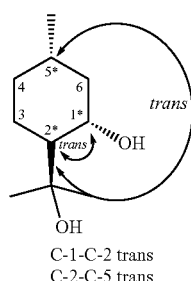

C-1-C-2 trans
C-2-C-5 trans

I-g

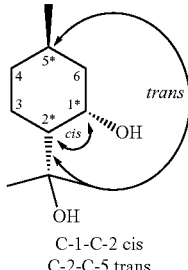

C-1-C-2 cis
C-2-C-5 trans

I-h

C-1-C-2 trans
C-2-C-5 trans

According to the invention, the cis stereoisomers of PMD correspond to a mixture of stereoisomers of PMD comprising at least one stereoisomer selected from the stereoisomers I-a, I-c, I-e and I-g.

According to the invention, the trans stereoisomers of PMD correspond to a mixture of stereoisomers of PMD that comprise at least one stereoisomer selected from the stereoisomers I-b, I-d, I-f and I-h.

Within the meaning and scope of the present invention, citronellol corresponds to 3,7-dimethyloct-6-en-1-ol (CAS number: 106-22-9) in one of its two enantiopure forms or as a racemic mixture.

Within the meaning and scope of the present invention, geraniol corresponds to trans-3,7-dimethyl-2,6-octadien-1-ol (CAS number: 106-24-1).

Preferably, the composition according to the invention is a repellent composition. Within the meaning and scope of the present patent application, the term "repellent composition" is understood to refer to a composition that provides the ability to effectively keep a hematophagous arthropod away from their "target" (humans or animals). Preferably, a repellent composition according to the invention exhibits repellent activity against hematophagous arthropods, preferably against mosquitoes, advantageously against the mosquito species *Aedes albopictus*, that is greater than or equal to the median effective dose ED 50 (equivalent to the half maximal effective concentration, EC 50) of pure p-menthane-3,8-diol.

Preferably, the composition according to the invention further comprises at least one compound selected from linalool, citronellal, isopulegol, and an acetal, the said acetal being produced by reaction between citronellal and p-menthane-3,8-diol.

Within the meaning and scope of the present invention, linalool corresponds to the compound 3,7-dimethylocta-1,6-dien-3-ol, in one of its two enantiopure forms or as a racemic mixture.

Within the meaning and scope of the present invention, citronellal corresponds to 3,7-dimethyloct-6-en-1-al (CAS number: 106-23-0), in one of its two enantiopure forms or as a racemic mixture.

Within the meaning and scope of the present invention, isopulegol corresponds to 5-methyl-2-prop-1-en-2-ylcyclohexan-1-ol, in the form of at least one of its stereoisomers or any one of the mixtures thereof.

Within the meaning and scope of the present invention, an acetal is a compound produced by an acetalisation reaction between the aldehyde functional group of citronellal and the two hydroxyl functional groups of PMD.

Preferably, the acetal corresponds to the compound (Ac) having the following formula:

(Ac)

in the form of at least one of its stereoisomers or any one of the mixtures thereof.

Preferentially, the composition according to the invention comprises, relative to the total number of moles:

from 40 to 99 mole %, preferably from 50 to 95 mole %, preferentially from 70 to 90 mole % of p-menthane-3,8-diol;

from 0.1 to 40 mole %, preferably from 0.5 to 30 mole %, preferentially from 1 to 25 mole % of geraniol;

from 0.5 to 50 mole %, preferably from 1 to 40 mole %, preferentially from 2 to 30 mole % of citronellol; and optionally, from 0.1 to 15 mole % of linalool; and optionally, from 0.1 to 40 mole %, preferably from 0.5 to 30 mole %, preferentially from 1 to 20 mole % of citronellal, and optionally, from 0.1 to 30 mole %, preferably from 1 to 20 mole %, preferentially from 1 to 15 mole % of isopulegol; and optionally, from 0.1 to 30 mole %, preferably from 0.5 to 20 mole %, preferentially from 1 to 10 mole %.

The present invention also relates to a composition comprising:

from 40 to 99 mole %, preferably from 50 to 95 mole %, preferentially from 70 to 90 mole % of p-menthane-3,8-diol;

from 0.1 to 40 mole %, preferably from 0.5 to 30 mole %, preferentially from 1 to 25 mole % of geraniol;

from 0.5 to 50 mole %, preferably from 1 to 40 mole %, preferentially from 2 to 30 mole % of citronellol; and optionally, from 0.1 to 15 mole % of linalool; and optionally, from 0.1 to 40 mole %, preferably from 0.5 to 30 mole %, preferentially from 1 to 20 mole % of citronellal; and optionally, from 0.1 to 30 mole %, preferably from 1 to 20 mole %, preferentially from 1 to 15 mole % of isopulegol; and optionally, from 0.1 to 20 mole %, preferably from 0.5 to 10 mole %, preferentially from 1 to 5 mole % of acetal;

the said acetal being produced by reaction between citronellal and p-menthane-3,8-diol.

The p-menthane-3,8-diol, geraniol, citronellol, linalool, citronellal, isopulegol and an acetal are as defined according to the invention.

Preferably, the composition according to the invention comprises:

from 70 to 90 mole % of p-menthane-3,8-diol;

from 1 to 25 mole % of geraniol; and from 2 to 30 mole % of citronellol.

Advantageously, the composition according to the invention is natural. The definition of a natural composition is as detailed here above.

Preferably, the composition according to the invention further comprises from 0.1 to 15 mole % of linalool.

Preferably, the composition according to the invention further comprises from 0.1 to 40 mole %, preferably from 0.5 to 30 mole %, preferentially from 1 to 20 mole % of citronellal.

Preferably, the composition according to the invention further comprises from 0.1 to 30 mole %, preferably from 1 to 20 mole %, preferentially from 1 to 15 mole % of isopulegol.

Preferably, the composition according to the invention further comprises from 0.1 to 20 mole %, preferably from 0.5 to 10 mole %, preferentially from 1 to 5 mole % of acetal, the said acetal being produced by reaction between citronellal and p-menthane-3,8-diol.

Preferably, in a composition of the invention, the p-menthane-3,8-diol is present in the form of at least one of its stereoisomers.

The stereoisomers of p-menthane-3,8-diol are as defined here above.

Preferably, the composition according to the invention is characterised in that the p-menthane-3,8-diol is present in the form of a mixture of cis and trans stereoisomers, the said mixture comprising from 10 to 90 mole %, preferably from 20 to 80 mole % of cis stereoisomers, and from 10 to 90 mole %, preferably from 20 to 80 mole % of trans stereoisomers.

The present invention also relates to a method for preparing a composition according to the invention, characterised in that it comprises a step a) of bringing citronellal into contact with an essential oil comprising geraniol and citronellol, and the obtaining of a composition according to the invention.

Within the meaning and scope of the present patent application, the term "essential oil" is understood to refer to a volatile odorous substance produced by certain plants and which is able to be extracted, preferably by hydrodistillation, in the form of a liquid.

The citronellal, geraniol and citronellol are as defined here above.

Preferably, the essential oil comprising geraniol and citronellol is selected from the group consisting of an essential oil derived from the species *Geranium rosat*, an essential oil from the species *Rosa damascena*, an essential oil from the species *Rosa gentifolia*, an essential oil from the species *Cympogon winterianus*, and an essential oil from the species *Nepata cataria*.

The essential oil from the species *Geranium rosat* may also be known as essential oil from the species *Pelargonium asperum*.

Preferably, the essential oil from the species *Geranium rosat* is sourced from China, Reunion, or Africa, preferably from Reunion or Egypt.

Preferably, the essential oil from the *Rosa damascene* species is sourced from Iran, China, Bulgaria or India.

Preferably, the essential oil from the *Rosa gentifolia* species is sourced from France, Egypt or Morocco.

Preferably, the essential oil from the species *Cympogon winterianus* is sourced from Reunion, Africa, Asia or South America, preferably from Reunion, China, Taiwan, Brazil, Argentina or Chile.

Preferably, the essential oil from the species *Nepata cataria* is sourced from Europe or North America.

In an advantageous manner, the essential oil comprising geraniol and citronellol is an essential oil from the species *Geranium rosat*.

In a preferred manner, the method according to the invention further comprises the following steps:

b. adding of water to the mixture obtained in the step a), preferably a volume of water that is between 1 and 10 times the volume of the said mixture; and c. heating the mixture obtained in the step b).

Preferably, the step c) of the method according to the invention is carried out at a temperature comprised between 40° C. and 120° C., preferably between 60° C. and 100° C., preferably between 80° C. and 100° C.; for example for a period of between 2 hours and 10 hours, preferably between 4 hours and 8 hours, preferentially between 5 hours and 7 hours.

In a preferential manner, the method according to the invention is characterised in that the citronellal is used in the form of an essential oil selected in particular from the group consisting of essential oils derived from the following species: *Eucalyptus citriodora, Cymbogon winterianus*, and *Citrus hystix*.

The essential oil from the species *Eucalyptus citriodora* may also be known as essential oil from the species *Corymbia citriodora*.

Preferably, the essential oil from the species *Eucalyptus citriodora* is sourced from Australia, China or South America, preferably from Australia.

Preferably, the essential oil from the species *Citrus hystrix* is sourced from Reunion or Madagascar.

Advantageously, the essential oil from the species *Citrus hystrix* is obtained from the leaves of the species *Citrus hystrix*.

Advantageously, the method according to the invention is characterised in that the mixture obtained in the step a) comprises from 30% to 99% by mass of an essential oil comprising citronellal, and preferably of essential oils derived from the species: *Eucalyptus citriodora, Cymbogon winterianus* or *Citrus hystix*; and from 1% to 70% by mass of an essential oil comprising geraniol and citronellol, and preferably of an essential oil from the species *Geranium rosat*.

The present invention also relates to the use of the composition according to the invention as a repellent agent that repels at least one insect.

The present invention also relates to the use of the composition according to the invention as a repellent agent that repels at least one hematophagous (or blood-feeding) arthropod.

Within the meaning and scope of the present invention, the term "repellent agent that repels at least one insect" is understood to refer to a compound or a composition that provides the ability to effectively keep an insect away from their "target" (humans or animals).

Within the meaning and scope of the present invention, the term "repellent agent that repels at least one hematophagous arthropod" is understood to refer to a compound or a composition that provides the ability to effectively keep a hematophagous (or blood-feeding) arthropod away from their "target" (humans or animals).

All of the essential oils are certified ORGANIC according to the COSMOS Organic standard by Ecocert Greenlife and guaranteed 100% pure, natural and whole.

Example 1: Production of PMD from a Mixture of Essential Oils

The PMD may be produced from a mixture of two essential oils in the presence of water.

In order to do this, 2 mL of a mixture of essential oil (EO) of *Eucalyptus citriodora* (EC) and essential oil of *Geranium rosat* (GR), in a mass ratio of 50/50, 75/25, or 90/10, are added to 8 mL of water. The mixture is heated at 100° C. for a period of 6 hours.

The results obtained are presented in the following table:

TABLE 1

| Compo | Essential oils (w/w %) | Composition of the organic phase at the end of the reaction | | | | | | | Conversion (mole %) | Selectivity (mole %) |
|---|---|---|---|---|---|---|---|---|---|---|
| | | Linalool (mole %) | Citronellal (mole %) | Isopulegol (mole %) | Citronellol (mole %) | Geraniol (mole %) | Acetal(s) (mole %) | PMD (mole %) | | |
| 1.1 | EC EO + GR EO (50/50) | 3.9% | 1.1% | 9.0% | 24.1% | 8.2% | 1% | 52.7% | 99% | 78% |
| 1.2 | EC EO + GR EO (75/25) | 1.4% | 11.0% | 10.5% | 12.6% | 4.2% | 1.5% | 58.8% | 81% | 77% |
| 1.3 | EC EO + GR EO (90/10) | 0.4% | 11.4% | 12.2% | 5.3% | 1.0% | 2.0% | 67.7% | 83% | 76% |

According to one embodiment, the repellant agent is in the form of a lotion, a cream or a spray.

According to one embodiment, the repellant agent is contained in a roll-on applicator.

In a preferred manner, in the use of the composition according to the invention as a repellant agent for repelling at least one insect, the insect is selected from the group consisting of mosquitoes, ticks and midges.

In an advantageous manner, in the use of the composition according to the invention as a repellent agent that repels at least one insect, the insect is selected from mosquitoes, preferably from the genus *Aedes, Anopheles*, or *Culex*, preferably the mosquito species is *Aedes albopictus*.

In a preferred manner, in the use of the composition according to the invention as a repellent agent that repels at least one hematophagous arthropod, the hematophagous arthropod is selected from the group consisting of mosquitoes, ticks and midges.

In an advantageous manner, in the use of the composition according to the invention as a repellent agent that repels at least one hematophagous arthropod, the hematophagous arthropod is selected from mosquitoes, preferably from the genus *Aedes, Anopheles*, or *Culex*, preferably the mosquito species is *Aedes albopictus*.

The invention will now be described by making use of the following non-limiting examples.

EXAMPLES

The N,N diethyl-meta-toluamide (DEET), commercial cis/trans PMD 75/25, citronellol, geraniol, and terpineol are acquired from Sigma-Aldrich.

The essential oils of *Eucalyptus citriodora, Geranium rosat, Cymbopogon winteranius* or *Citrus hystrix* are acquired from the Compagnie des Sens.

The conversion rate corresponds to the percentage of citronellal comprised in the essential oil that reacted at the end of the reaction, and the selectivity corresponds to the ratio in percentage of the amount of PMD obtained over the amount of citronellal converted.

The essential oil of *Eucalyptus citriodora* may be replaced by the essential oil of *Cymbopogon winteranius* or *Citrus hystrix*.

Example 2: Behavioural Testing of *Aedes albopictus* vis-à-vis the Compositions of the Invention Testing was performed as to the activity of the compositions obtained by the method according to the invention on the behaviour of the tiger mosquito, *Aedes albopictus*.

The behavioural tests were carried out at the Montpellier Vectopôle, which is a research centre that collaborates with the WHO for the evaluation of insecticides in public health.

The tests were carried out on mosquitoes aged 5 to 9 days old after their evolution from pupae to adult.

In preparation for the experiment, the mosquitoes were fed sugar water only on the day prior thereto, in order to promote their appetite for the test to occur the subsequent day. Each test was carried out during the afternoon, the period during which the mosquitoes are most active.

Each cup contains a damp cotton. The female mosquitoes were removed from the cage making use of a tube that enables aspiration thereof. They were then introduced into each experiment cup (10 mosquitoes per cup).

The tests were carried out on plexiglass racks serving as supports for glass bells known as feeders. The latter are connected to each other by plastic pipes wherein water circulates at 37° C.

Pig intestinal skin was used to mimic human skin in the experiment. The pieces of intestinal skin are positioned and stretched over the feeders.

The repellent is diluted in ethyl alcohol (aka ethanol or EtOH) and is deposited on the skin using a micropipette and then spread over the entire surface. The concentration of commercial PMD is that of ED 50 (that is, the "median effective dose", which corresponds to the dose necessary for an active ingredient to produce a specific effect in 50% of a population tested with that dose), which was established at 200 mg/m$^2$, tantamount to a concentration of 0.02036 mg/µL. If the composition tested is a mixture of at least two compounds, one of which is PMD, the said composition is diluted in ethanol at a concentration of 0.02036 mg/µL, or else is diluted in ethanol until 0.02036 mg/µL of PMD is obtained.

The feeders are turned over, then 300 µL of sheep blood are placed in each feeder. The cups are inserted under each feeder.

Polystyrene plates are inserted between the lines of repellent so as to avoid possible interactions of odours. The duration of the experiment is one hour. The cups are then placed in a freezer at −20° C. for a period of 40 minutes. After freezing, the contents of one cup are placed between two sheets of paper, with the entirety thereof then being crushed with a plexiglass plate. The counting of the blood-fed (engorged) mosquitoes is done based on the number of red dots on the sheet of paper. The results are expressed as a percentage of repellency (100%-X % of blood-feeding). The percentage of blood-feeding is defined in relation to the EtOH negative control. DEET and commercial cis/trans PMD 75/25 at 200 mg/m$^2$ were used as positive controls.

The results obtained were statistically analysed using R software (R Development Core Team. R: A language and environment for statistical computing. R Foundation for Statistical Computing, Vienna, Austria. ISBN 3-900051-07-0, 2013) and represent the mean of 16 replicates. The percentage repellency values are presented as the mean±standard deviation. The R software also makes it possible to compare two percentage repellency values by means of calculating the quantity p. This quantity p is a probability. If p<0.005, the difference observed between the two compared values of percentage repellency is significantly different from a statistical standpoint.

The repellent activity of the compositions obtained according to the method of the invention were tested on tiger mosquitoes according to the protocol described here above. These activity results were compared with those of DEET and commercial PMD, as well as with the activity of mixtures having mass ratios of 50/50, 75/25, or 90/10, of *Eucalyptus citriodora* (EC) essential oil and *Geranium rosat* (GR) essential oil which have not been heated in the presence of water.

The results are presented in the following table:

TABLE 2

| Repellent Composition | % Repellency |
| --- | --- |
| DEET (110 mg/m$^2$ in EtOH) (positive control) | 76 ± 9 |
| Commercial cis/trans PMD 75/25 (200 mg/m$^2$ in EtOH) (positive control) | 51 ± 11 |
| Mixture of EC EO + GR EO (50/50) (0.02036 mg/µL in EtOH) | 53 ± 10 |
| Composition 1.1 (0.02036 mg/µL in EtOH) | 80 ± 4 |
| Mixture of EC EO + GR EO (75/25) (0.02036 mg/µL in EtOH) | 68 ± 7 |
| Composition 1.2 (0.02036 mg/µL in EtOH) | 74 ± 6 |
| Mixture of EC EO + GR EO (90/10) (0.02036 mg/µL in EtOH) | 59 ± 7 |
| Composition 1.3 (0.02036 mg/µL in EtOH) | 86 ± 18 |

The compositions according to the invention are systematically more repellent than mixtures of *Eucalyptus citriodora* (EC) essential oil and *Geranium rosat* (GR) essential oil prior to heating in the presence of water.

From a statistical perspective, the compositions 1.1, 1.2, and 1.3 exhibit the same level of repellent activity.

These results are all the more remarkable considering that these compositions correspond to a mixture comprising PMD and other compounds. A composition tested at a concentration of 0.02036 mg/µL therefore contains less PMD than the positive control commercial cis/trans PMD 75/25, also tested at 0.02036 mg/µL (200 mg/m$^2$ in EtOH).

A second series of tests was carried out by adjusting the quantity of composition according to the invention deposited in a manner such that the skin surface tested contained 200 mg/m$^2$ of PMD.

The results are presented in the following table:

TABLE 3

| Repellent Composition | % Repellency |
| --- | --- |
| DEET (110 mg/m$^2$ in EtOH) (positive control) | 56 ± 8 |
| Commercial cis/trans PMD 75/25 (200 mg/m$^2$ in EtOH) (positive control) | 55 ± 1 |
| Mixture of EC EO + GR EO (50/50) (quantity of PMD adjusted to 200 mg/m$^2$) | 52 ± 13 |
| Composition 1.1 (quantity of PMD adjusted to 200 mg/m$^2$) | 89 ± 2 |
| Mixture of EC EO + GR EO (75/25) (quantity of PMD adjusted to 200 mg/m$^2$) | 35 ± 26 |
| Composition 1.2 (quantity of PMD adjusted to 200 mg/m$^2$) | 97 ± 2 |
| Mixture of EC EO + GR EO (90/10) (quantity of PMD adjusted to 200 mg/m$^2$) | 43 ± 6 |
| Composition 1.3 (quantity of PMD adjusted to 200 mg/m$^2$) | 83 ± 3 |

By adjusting the PMD concentration to 200 mg/m$^2$ for each test, all the compositions according to the invention are more repellent than commercial PMD (p<0.001).

Composition 1,2 is the one that shows the strongest repellent activity.

These surprising results may be the consequence of a synergistic effect among three compounds present in the composition according to the invention: PMD, citronellol, and geraniol.

In order to illustrate this phenomenon, the repellent activity of compositions comprising commercial PMD (cis/trans 75/25 mixture) alone or in a mixture with citronellol and/or geraniol were tested on tiger mosquitoes according to the protocol described here above.

In the rest of the results, X % by mass (mass %) of a compound added to commercial PMD at 200 mg/m$^2$ signifies that the said compound was tested at a concentration of X*200 mg/m$^2$.

The results are presented in the following tables:

TABLE 4

| Repellent Composition | % Repellency |
| --- | --- |
| DEET (110 mg/m$^2$ in EtOH) | 39 ± 7 |
| Commercial cis/trans PMD 75/25 (200 mg/m$^2$ in EtOH) | 31 ± 7 |
| Commercial cis/trans PMD 75/25 (200 mg/m$^2$ in EtOH) + 5 mass % of citronellol | 63 ± 7 |
| Commercial cis/trans PMD 75/25 (200 mg/m$^2$ in EtOH) + 5 mass % of citronellol + 21 mass % of geraniol | 92 ± 1 |

13

TABLE 5

| Repellent Composition | % Repellency |
|---|---|
| DEET (110 mg/m² in EtOH) | 49 ± 17 |
| Commercial cis/trans PMD 75/25 (200 mg/m² in EtOH) | 36 ± 1 |
| Commercial cis/trans PMD 75/25 (200 mg/m² in EtOH) + 21 mass % of citronellol + 5 mass % of geraniol | 92 ± 1 |
| Commercial cis/trans PMD 75/25 (200 mg/m² in EtOH) + 12.5 mass % of citronellol + 12.5 mass % of geraniol | 91 ± 5 |
| Commercial cis/trans PMD 75/25 (200 mg/m² in EtOH) + 5 mass % of citronellol + 21 mass % of geraniol | 94 ± 3 |

The adding of citronellol to the commercial PMD increases its repellent activity (p=0.0267). In addition, the simultaneous adding of citronellol and geraniol considerably enhances the repellent activity of PMD; this conclusion proves to be true regardless of the relative quantities of PMD, citronellol, and geraniol (in each case, p<0.001).

TABLE 6

| Repellent Composition | % Repellency |
|---|---|
| DEET (110 mg/m² in EtOH) | 73 ± 2 |
| Commercial cis/trans PMD 75/25 (200 mg/m² in EtOH) | 48 ± 15 |
| Commercial cis/trans PMD 75/25 (100 mg/m² in EtOH) + 21 mass % of citronellol + 5 mass % of geraniol | 57 ± 12 |
| Commercial cis/trans PMD 75/25 (100 mg/m² in EtOH) + 12.5 mass % of citronellol + 12.5 mass % of geraniol | 61 ± 2 |
| Commercial cis/trans PMD 75/25 (100 mg/m² in EtOH) + 5 mass % of citronellol + 21 mass % of geraniol | 68 ± 13 |
| Commercial cis/trans PMD 75/25 (100 mg/m² in EtOH) + 5 mass % of citronellol + 21 mass % of geraniol + 1% of terpineol | 77 ± 6 |

It has also been shown that a two-fold dilution of the composition PMD/geraniol/citronellol (PMD at 100 mg/m²) remains at least as active as the PMD that is twice as concentrated (PMD at 200 mg/m²). It may therefore be concluded that the combination of these three compounds makes it possible to decrease by half the quantity of PMD while maintaining the same level of repellent activity.

Consequently, the method according to the invention provides the ability to generate, by simple addition of water, a natural composition with a very high level of repellent activity, thereby making it possible to use small quantities of PMD, citronellol, and geraniol and thus to limit the risks of skin irritation observed with essential oils when used in extremely high quantities.

TABLE 7

| Repellent Composition | % Repellency |
|---|---|
| DEET (110 mg/m² in EtOH) | 43 ± 13 |
| Commercial cis/trans PMD 75/25 (200 mg/m² in EtOH) | 52 ± 12 |
| GR EO (0.02036 mg/μL in EtOH) | 70 ± 10 |
| GR EO + Commercial cis/trans PMD 75/25 (200 mg/m² in EtOH) | 93 ± 2 |
| EC EO (0.02036 mg/μL in EtOH) | 12 ± 7 |
| EC EO + Commercial cis/trans PMD 75/25 (200 mg/m² in EtOH) | 74 ± 3 |

The addition of commercial PMD to the *Geranium rosat* essential oil (GR EO) makes it possible to regain the efficaciousness of the PMD/citronellol/geraniol combination, which thus constitutes a clear confirmation of the interesting benefit of effecting this combination.

In a similar manner, the addition of PMD to the *Eucalyptus citriodora* essential oil (EC EO) clearly increases the efficaciousness of this essential oil alone or of PMD alone, however the repellent activity of the said mixture remains lower than that of the two best combinations: PMD/citronellol/geraniol, and PMD/GR EO.

In conclusion, the PMD/citronellol/geraniol combination is ideal in terms of repellent activity; it can be obtained by the mixing of the three aforementioned compounds, or by the addition of commercial PMD into the *Geranium rosat* essential oil, or even more simply and in a more natural manner by the method according to the invention which entails the mixing of the two essential oils of Lemon Eucalyptus and *Geranium rosat*, the composition whereof is modified by the addition of water.

The invention claimed is:

1. A natural repellent composition, prepared solely from natural reagents, that repels at least one hematophagous arthropod, the composition comprising, relative to the total number of moles:

from 40 to 99 mole % of p-menthane-3,8-diol;

from 0.5 to 50 mole % of citronellol;

from 0.1 to 40 mole % of geraniol; and citronellal and an acetal, said acetal being produced by reaction between citronellal and p-menthane-3,8-diol.

2. The natural repellent composition according to claim 1, wherein the composition further comprises at least one compound selected from the group consisting of linalool and isopulegol.

3. The composition according to claim 1, wherein the p-menthane-3,8-diol is present in the form of at least one of its stereoisomers.

4. The composition according to a claim 1, wherein the p-menthane-3,8-diol is present in the form of a mixture of cis and trans stereoisomers, said mixture comprising from 10 to 90 mole % of cis stereoisomers, and from 10 to 90 mole % of trans stereoisomers.

5. A composition, prepared solely from natural reagents, comprising:

from 40 to 99 mole % of p-menthane-3,8-diol;

from 0.1 to 40 mole % of geraniol;

from 0.5 to 50 mole % of citronellol; and citronellal and an acetal, said acetal being produced by reaction between citronellal and p-menthane-3,8-diol.

6. The composition according to claim 5, wherein the composition comprises:

from 70 to 90 mole % of p-menthane-3,8-diol;

from 1 to 25 mole % of geraniol; and from 2 to 30 mole % of citronellol.

7. The composition according to claim 5, wherein the composition is natural.

8. The composition according to claim 5, wherein the composition further comprises from 0.1 to 15 mole % of linalool.

9. The composition according to claim 5, wherein the composition comprises from 0.1 to 40 mole % of citronellal.

10. The composition claim 5, wherein the composition further comprises from 0.1 to 30 mole % of isopulegol.

11. The composition according to claim 5, wherein the composition comprises from 0.1 to 20 mole % of acetal.

12. A method of repelling at least one hematophagous arthropod from a target of the hematophagous arthropod, comprising applying the composition according to claim 1 on the target.

13. The method according to claim 12, wherein the hematophagous arthropod is selected from the group consisting of mosquitoes, ticks and midges.

14. The method according to claim 12, wherein the hematophagous arthropod is selected from mosquitoes.

* * * * *